US012812405B2

(12) United States Patent
Bernsen

(10) Patent No.: US 12,812,405 B2
(45) Date of Patent: Nov. 24, 2026

(54) LOOP PREVENTION WHEN RECONFIGURING DEVICES

(71) Applicant: KONINKLIJKE PHILIPS N.V., Eindhoven (NL)

(72) Inventor: Johannes Arnoldus Cornelis Bernsen, Eindhoven (NL)

(73) Assignee: Koninklijke Philips N.V., Eindhoven (NL)

( * ) Notice: Subject to any disclaimer, the term of this patent is extended or adjusted under 35 U.S.C. 154(b) by 612 days.

(21) Appl. No.: 17/922,440

(22) PCT Filed: Apr. 28, 2021

(86) PCT No.: PCT/EP2021/061036
§ 371 (c)(1),
(2) Date: Oct. 31, 2022

(87) PCT Pub. No.: WO2021/219673
PCT Pub. Date: Nov. 4, 2021

(65) Prior Publication Data

US 2023/0300633 A1 Sep. 21, 2023

(30) Foreign Application Priority Data

May 1, 2020 (EP) .................................... 20172609
Jun. 22, 2020 (EP) .................................... 20181399
Jul. 13, 2020 (EP) .................................... 20185523

(51) Int. Cl.
*H04W 24/02* (2009.01)
*H04W 12/0471* (2021.01)

(52) U.S. Cl.
CPC ....... *H04W 24/02* (2013.01); *H04W 12/0471* (2021.01)

(58) Field of Classification Search
None
See application file for complete search history.

(56) References Cited

U.S. PATENT DOCUMENTS

2017/0257819 A1* 9/2017 McCann ................ H04L 67/02
2018/0069851 A1 3/2018 Terao
(Continued)

FOREIGN PATENT DOCUMENTS

EP 3618475 * 3/2020
EP 3618475 A1 * 3/2020 ............ H04W 12/02
JP 2018160837 A 10/2018

OTHER PUBLICATIONS

Draft Device Provisioning Protocol Specification Version 1.2 Mar. 3, 2020.*

(Continued)

*Primary Examiner* — Christopher T Wyllie

(57) ABSTRACT

There is provided a method of configuring an Enrollee device for communications in a wireless network comprises a Configurator device, the Configurator and Enrollee devices performing at least part of a configuration protocol, the Enrollee device encrypting Enrollee identifying information using a public key information of the Configurator and random information to produce a first encrypted message, the Enrollee device transmitting the first encrypted message to the Configurator device, the Configurator device receiving the first encrypted message, the Configurator device decrypting the first encrypted message using private key information associated with the public key, the Configurator device identifying the Enrollee device using the Enrollee identifying information and deciding whether or not it should continue the configuration based on the Enrollee identifying information. There are also provided Configurator and Enrollee devices arranged to perform the method.

20 Claims, 3 Drawing Sheets

(56) References Cited

U.S. PATENT DOCUMENTS

| | | | | |
|---|---|---|---|---|
| 2019/0116179 | A1 | 4/2019 | Xu | |
| 2020/0146101 | A1* | 5/2020 | Tsuboi | H04W 56/0045 |
| 2020/0221296 | A1* | 7/2020 | Jiang | H04L 63/0869 |
| 2021/0195423 | A1 | 6/2021 | Goto | |
| 2023/0171097 | A1* | 6/2023 | Bernsen | H04L 9/088 713/155 |
| 2023/0300633 | A1* | 9/2023 | Bernsen | H04W 12/0471 370/252 |
| 2023/0362657 | A1* | 11/2023 | Bernsen | H04L 9/088 |
| 2024/0031362 | A1* | 1/2024 | Goto | H04W 12/06 |

OTHER PUBLICATIONS

DPP V1.2 (Year: 2020).*

(https://groups.wi-fi.org/apps/org/workgroup/wfa-dpp/download.php/106776/Device_Provisioning_Protocol_Specification_v1.2.4.docx.

IEEE Computer Society, "IEEE Standard for Information Technology—Telecommunications and Information Exchange Between Systems—Local and Metropolitan Area Networks—Specific requirements Part 11: Wireless LAN Medium Access Control (MAC) and Physical Layer (PHY) Specifications," (IEEE Std. 802.11-2016), Dec. 2016.

Diffie, W.; Hellman, M. (1976), "New directions in cryptography", IEEE Transactions on Information Theory, 22 (6): 644-654.

FIPS180-4, "Secure Hash Standard", United States of America, National Institute of Standards and Technology, Federal Information Processing Standard (FIPS) 180-4.

Internet Key Exchange (IKE) Attributes, Group Description (Value 4), https://www.iana.org/assignments/ipsec-registry/ipsec-registry.xhtml#ipsec-registry-10.

NIST Special Publication 800-56A, Revision 3, "Recommendation for Pair-Wise Key-Establishment Schemes Using Discrete Logarithm Cryptography", Elaine Barker, Lily Chen, Allen Roginsky, Apostol Vassilev, Richard Davis, https://doi.org/10.6028/NIST.SP.800-56Ar3.

D. Harkins et al RFC 2409, The Internet Key Exchange, Nov. 1998, https://datatracker.ietf.org/doc/rfc2409/.

M. Lochter et al RFC 5639, Elliptic Curve Cryptography (ECC) Brainpool Standard Curves and Curve Generation, Mar. 2010, https://datatracker.ietf.org/doc/rfc5639/.

D. McGrew et al RFC 6090, Fundamental Elliptic Curve Cryptography Algorithms, Feb. 2011 https://datatracker.ietf.org/doc/rfc6090/.

International Search Report and Written Opinion from PCT/EP2021/061036 mailed Jun. 2, 2021.

Sethi Ericsson B et al Solutions M: "Secure IoT Bootstrapping: A Survey; draft-sarikaya-t2trg-sbootstrapping-08.txt" •Secure IoT Bootstrapping: a Survey;draft-sarikaya-t2trg-sbootstrapping-08.txt ; Internet-Draft: Network Working Group, Internet Engineering Task Force, IETF; Standardworkingdraft, Internet Society (IS•No. 89 Mar. 2020 (Mar. 9, 2020), pp. 1-23.

Aritro Sengupta and Utpal Kumar Ray, "Message mapping and reverse mapping in elliptic curve cryptosystem", Security Comm. Networks 2016; 9:5363-5375, Published online Nov. 22, 2016 in Wiley Online Library (wileyonlinelibrary.com). DOI: 10.1002/sec.1702.

RFC 5280, Internet X.509 Public Key Infrastructure Certificate and Certificate Revocation List (CRL) Profile, https://datatracker.ietf.org/doc/rfc5280/.

RFC 6090, Fundamental Elliptic Curve Cryptography Algorithms, Feb. 2011 https://datatracker.ietf.org/doc/rfc6090/.

Rivest, R.; Shamir, A.; Adleman, L. (Feb. 1978). "A Method for Obtaining Digital Signatures and Public-Key Cryptosystems", Communications of the ACM vol. 21, No. 2.

* cited by examiner

LOOP PREVENTION WHEN RECONFIGURING DEVICES

CROSS REFERENCE TO RELATED APPLICATIONS

This application is a U.S. national phase application of International Application No. PCT/EP2021/061036 filed on Apr. 28, 2021, which claims the benefit of EP Application Serial No. 20172609.8 filed May 1, 2020 and and EP Application Serial No. 20181399.5 filed Jun. 22, 2020 and 20185523.6 filed Jul. 13, 2020 and are incorporated herein by reference.

FIELD OF THE INVENTION

The present invention relates to devices and methods for use in wireless networks, in particular those conforming to the IEEE 802.11 family of standards.

BACKGROUND OF THE INVENTION

FIG. 1 represents a wireless network 1 which contains a first device 2 and another device 3. The first device 2 may have a central function and be like an Access Point (AP), a hub or a gateway device. The first device 2 will henceforth be referred to as an AP for simplicity though other types of device are indeed possible. The user (not shown) wishes to add two more devices to the network 1, namely a complex device 4 (here represented as a computer) and a simple device 5 (here represented as a toothbrush). Devices like the simple device 5 often do not have any real user interface (UI) other than perhaps a light and, accordingly, are often called 'headless' devices. The AP 2 has a processor 6 and the simple device 5 has a microcontroller and small non-volatile memory 7 and a button 8 which may be used to reset the simple device 5. There is also a third device 9.

Some wireless networking standards allow for one device to configure another in order to establish a connection and communicate. This makes the task of adding, or enrolling, a new device in a network less onerous in that the user no longer has to make manual entries. The device requiring configuration in order to join the network may be called an 'Enrollee' and the device performing the configuration may be called a 'Configurator'.

It may occur that, despite and apparently successful completion of a configuring process, the configured device is still unable to connect to the network 1 (or has been connected but for some reason cannot (re)connect. A number of possible causes for this situation exist, some of which are

- the Enrollee was able to contact a node that uses the network ID configured in the Enrollee and send its information and relevant keys to this node in a message to request to join, but receives a response indicating that the request is invalid or does not match expected values. In the case of IEEE 802.11 Device Provisioning Protocol (DPP) (otherwise known as 'Wi-Fi Easy Connect™'), the node may be an AP, the request message is to this AP in a DPP Peer Discovery Request message containing a DPP Connector. The response is a DPP Peer Discovery Response message and the DPP status therein is "STATUS_INVALID_CONNECTOR" or "STATUS_NO_MATCH". Reasons for these error codes are listed in clause 6.6.1 of [DPP]. One of the reasons listed there for the DPP Status "STATUS_INVALID_CONNECTOR" is that the Enrollee NAK has expired and is no longer acceptable to the AP.
- The Enrollee was able to contact s node in the network that uses the ID configured in the Enrollee, but the passphrase or PSK (Pre Shared Key) configured in the Enrollee proved to be incorrect when the Enrollee tried to associate with the node.
- The Enrollee scanned a list of channels (list included) but could not find a node with the configured ID. This may e.g. be the result of the node having moved to a channel that the Enrollee does not support, the Enrollee and/or the node being moved physically out of range, or an object that blocks the signals has been placed in between the Enrollee and the node.

In DPP, a Connector is a data structure containing information that allows the recipient device to establish a trust relationship with another device in the network in question. The Connector may contain information such as network access keys (NAK) which are used to establish shared secrets or encryption keys for use between the recipient and other devices in the network.

Devices that have a user interface, such as the complex device 4 can show the status of the connection with the AP (or equivalent node in the network in question) after configuration and if problems have occurred, for example if the device cannot find the AP (or other device to which the connection is desired). Also, the UI if a complex device may display instructions for the user on how to resolve the connection problem.

However, with simple (headless) devices, the only way the user can observe a successful connection is by either testing the functioning of the connection or inspecting the UI of the Access Point (AP), hub or gateway. If, after a configuration, these devices run into a problem when trying to connect to the network for which they were configured to connect to, the user has no idea what has gone wrong and may not realise until sometime later when they find the connection is not present or unless they think to check the AP's UI.

SUMMARY OF THE INVENTION

Thus there is a need to provide a method of configuring an Enrollee device for communications in a wireless network, the method being arranged to be used with a Configurator device and which comprises, the Configurator and Enrollee devices performing at least part of a configuration protocol, the Enrollee device encrypting Enrollee identifying information using a public key information of the Configurator and random information to produce a first partly encrypted message, the Enrollee device transmitting the first partly encrypted message to the Configurator device, the Configurator device receiving the first partly encrypted message, the Configurator device decrypting the encrypted part of the first encrypted message using private key information associated with the public key, the Configurator device identifying the Enrollee device using the Enrollee identifying information and deciding whether or not it should continue the configuration based on the Enrollee identifying information.

When the Configurator is able to identify the actual device, it may be able to determine that there are circumstances which mean that the (re)configuration should not proceed—or at least not without user intervention. The Configurator may able to determine that this is the case by identifying the relevant message from the Enrollee it received concerning the status of the connection. For example, when the Enrollee has failed to find an AP, the user intervention could be something like moving the Enrollee closer to the relevant access point or fixing a problem with the access point. However, the current trend of using different random MAC addresses for different protocol exchanges presents a problem. The consequence of a device using random MAC addresses for a DPP reconfiguration is that the Configurator now does not know the actual identity of the Enrollee until multiple messages have been exchanged which is wasteful of resources. By allowing identification of the Enrollee from its initial request for reconfiguration, the Configurator may then identify the Enrollee's connection status from the history it has, and terminate the reconfiguration where it identifies a problem needing user intervention.

In an aspect, if the Configurator decides it should not continue with the configuration, it does not reply to the first encrypted message. This allows a simple termination of this cycle of reconfiguration.

In an aspect, the Enrollee device transmits the first partly encrypted message as a result of failing to connect to the wireless network.

In an aspect, if the Configurator decides it should not continue with the configuration, it sends a rejection message to the Enrollee. This allows an Enrollee with a more advanced interface to signal to the user the advent of a connection/configuration problem.

In an aspect, the configuration protocol is according to the Wi-Fi DPP protocol and the first encrypted message is the DPP Reconfiguration Announcement message.

In an aspect, the identifying information is used by the Configurator device to identify a stored record of an Enrollee connection status previously sent by the Enrollee device during the execution of part of the configuration protocol.

The method of any previous claim wherein the part of the configuration protocol comprises sending, by the Enrollee device, the Enrollee identifying information.

This allows the Configurator to identify the Enrollee and find its connection status history.

In an aspect, the Configurator, is arranged to display a status and/or instructions for the user in the event of a decision not to continue. This helps the user resolve the problems.

There is also provided, an Enrollee device arranged to be configured for communication in a wireless network by a Configurator device using a configuration protocol. The Enrollee device comprises a receiver arranged to receive a Configurator device public key from the Configurator device, a security module arranged to encrypt, using the Configurator device public key, a first partly encrypted message, the first encrypted message comprising an Enrollee identifying information and a random information, and a transmitter arranged to transmit the first partly encrypted message to the Configurator device.

In an aspect, the Enrollee device sends the first partly encrypted message as a result of failing to connect to the wireless network.

There is provided a Configurator device arranged to configure an Enrollee device using a configuration protocol. The Configurator device comprises a transmitter, arranged to send a Configurator device public key to the Enrollee, a receiver arranged to receive a first partly encrypted message from the Enrollee device, a security module arranged to decrypt, using a Configurator device private key, the encrypted part of the first partly encrypted message and to derive Enrollee identifying information from the first encrypted message, and a processor arranged to decide whether or not to continue the configuration protocol based on the Enrollee identifying information.

In an aspect, the Configurator device is arranged to display a status and/or instructions to the user in the event of a decision not to continue the protocol.

There are also provided computer program products on a machine readable medium, configured, when run a Configurator processor and Enrollee processors, to implement the Configurator and Enrollee parts of the described herein.

BRIEF DESCRIPTION OF THE DRAWINGS

The above, as well as additional objects, features and advantages of the disclosed devices, systems and methods, will be better understood through the following illustrative and non-limiting detailed description of embodiments of devices and methods, with reference to the appended drawings, in which.

DETAILED DESCRIPTION OF EMBODIMENTS

In the following description, same references designate like elements.

Figure 1:
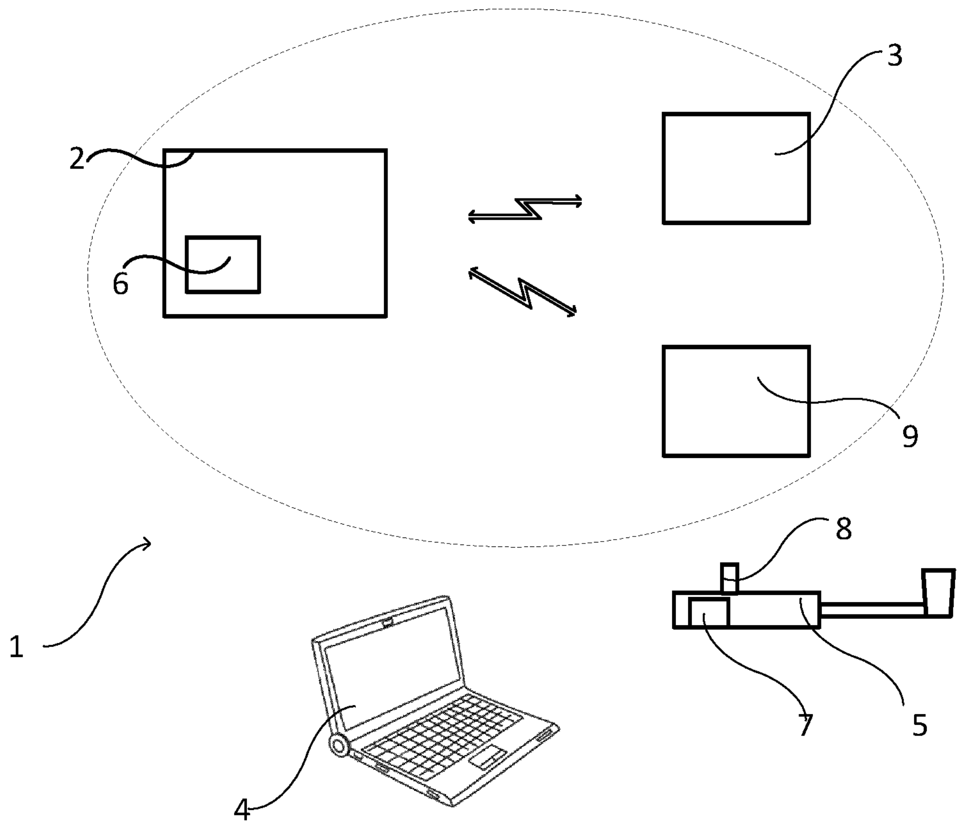
FIG. 1 represents a wireless network for which it is desired to configure devices for addition.
Figure 2:
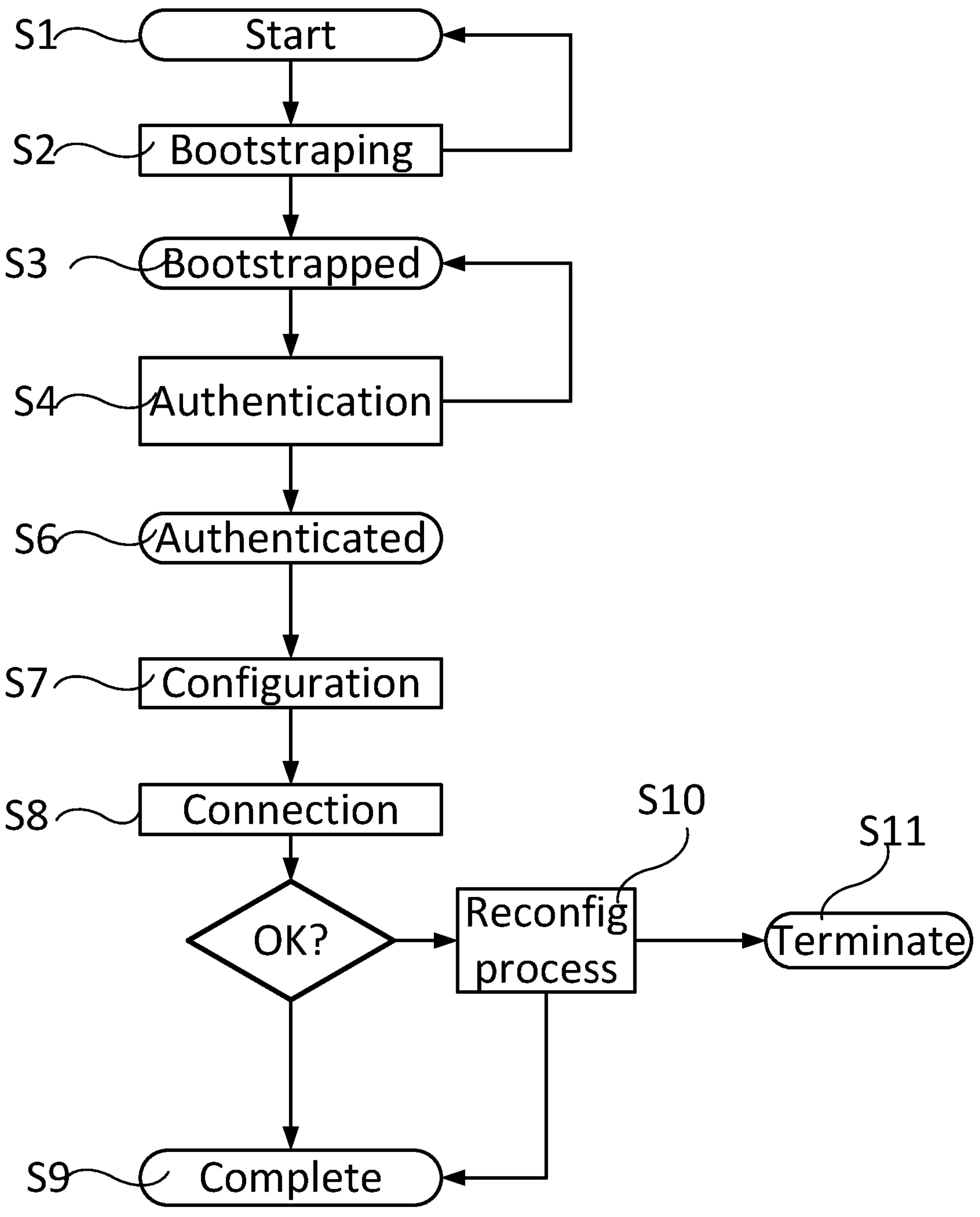
FIG. 2 represents the flow of a configuration process according to an embodiment.

FIG. 2 represents a flow of a device-controlled configuration method according to embodiments whereby one device such as the third device 9 of FIG. 1 may configure and connect to another device such as the complex or simple devices 4, 5 of FIG. 1. The third device 9 and the device 4, 5 are according to embodiments. As an example, the case of the simple device 5 will be discussed. It should be understood, that though much of this description provides examples involving a network with a device like the AP 2, the process could work in a peer-to-peer situation.

One example of a device-controlled configuration method is the Device Provisioning Protocol (DPP) which is used in networks using Wi-Fi or IEEE 802.11. In the Device Provisioning Protocol (DPP), a device acting as a DPP Configurator can securely configure any Wi-Fi enabled device for connecting to a Wi-Fi AP.

At S1, the process starts with the two devices 9 and 5 in an unconnected state and device is un-configured. For the purposes of discussion, device 9 will be used to configure device 5 for joining the wireless network 1 so device 9 may be referred to as the Configurator and device 5 as the Enrollee (since it is being 'enrolled' in the wireless network 1).

At S2, often referred to as 'bootstrapping', whereby one device, the Responder, obtains the bootstrapping public key (BR) of the other device, the Initiator. When mutual authentication is desired by the Responder device, it too obtains the bootstrapping public key (Bi) of the Initiator. This is achieved by another means than the wireless communication technology and so is commonly called 'out-of-band' communication (OOB). Examples of this can be the user causing one device to read a QR code on the other device, NFC communication between the two device or another wireless technology e.g. Bluetooth. The bootstrapping process is initiated by a user intervention. If the bootstrapping has been successful, the process arrives as S3 and the devices 9, 5 are 'bootstrapped', otherwise they revert to the 'start' state at S1. In either case, the Enrollee device (in this case the simple device 5) may record in an appropriate storage, for example as a flag in a register in memory, the result of the bootstrapping process. Frequently, simple devices are programmed to wake up after manufacturing or after a reset and turn on their radio on the channel indicated in their QR-code for configuration and start listening for an authentication request message At S4, the devices 9, 5 perform an authentication procedure whereby the devices establish 'trust' i.e. the user is able to be confident that the devices are what they believe them to be and not other unknown (and potentially malicious) devices 'pretending' to be one or other of the devices in question. A message is sent from one device requesting to start an authentication. This message can be sent by either the device doing the configuring (Configurator) or the device to be configured, the Enrollee. In this example, the third device 9 acts as the Configurator and the simple device 5 as the Enrollee. It should be noted that the third device 9 is shown as being connected to the network 1 though this is not necessarily required for the embodiments to work. The device starting the wireless communication is called the Initiator and the device responding is called the Responder. The DPP protocol, in particular, allows both a Configurator and an Enrollee device to act as the Initiator of the DPP protocol, whereby the other device automatically becomes the Responder. Simple devices or headless device usually will assume the Responder role.

The other device responds to this message. If the authentication request message is decoded correctly and contains the information indicating that the Initiator is the device the Responder device believes it to be and has the required capabilities, the response message indicates that the message has been 'accepted' and contains information needed by the Initiator to verify the credentials of the Responder and that it too has the required capabilities. If the two devices do not receive from the other device the required information, the process aborts and the device return to the bootstrapped state at S3. If the Initiator is the Enrollee, the authentication request message may also contain an additional part indicating the result of a previous attempt to configure the Enrollee. If the Responder is the Enrollee, then the authentication response message may contain the additional part indicating the result of the previous attempt. It should be understood that the indication also indicates whether or not there has been a previous attempt.

In the case of the DPP protocol, the first message is the Authentication Request message and the response message is the DPP Authentication Response. The Responder checks the DPP Authentication Request message contains a correctly generated cryptographic hash of the Responder public bootstrapping key and whether it has a copy of the Initiator's public bootstrapping key. The responder sends a DPP Authentication Respond message indicating whether the authentication can continue. If not, because for example the attempt to decrypt an encrypted nonce in the DPP Authentication Request message fails, the process is aborted. The DPP Authentication Response contains a cryptographic hash of the Responders public bootstrapping key and may contain the hash of the Initiator public bootstrapping key. Likewise, for the Initiator, the Enrollee may have obtained this public key by an OOB communication. The public bootstrapping key of the Initiator may then be used for mutual authentication. Without the public bootstrapping key of the Initiator, only the Initiator can authenticate the Enrollee, but not the other way around.

If the authentication response message indicates that the Responder has accepted the authentication request message and the response meets the criteria imposed by the set-up of the Initiator, the Initiator issues an authentication confirmation message. If the authentication values in the authentication response and the confirmation message are found to be correct by the relevant devices, this part of the protocol, the authentication part, is successful, the process has reached S6 and configuration can start. The confirmation message may also contain an indication of the result of a previous configuration attempt where the Enrollee is also the Initiator.

In the case of the DPP protocol, the authentication confirmation message is the DPP Authentication Confirm message.

At S7, the Enrollee device sends a configuration request message with information on what type of configuration the Enrollee wants. If the Configurator is able to grant the request, it sends a message with the information needed by the Enrollee such as a network key. The process then concludes at S8 with a successful configuration of the Enrollee. According to an embodiment, the configuration request may contain an indication of the result of a previous configuration attempt.

In the case of DPP, the request message is the DPP Configuration Request and the Configurators response is the DPP Configuration Response message. The DPP Configuration Response may contain the service set identifier (SSID) of the network the Enrollee should connect to and may contain a DPP Connector. The DPP Connector is digitally signed by the Configurator using a key (the C-sign key) and contains, among other things, the public network access key of the Enrollee. The DPP Configuration Response message also contains the public signing key of the Configuration. Other devices that have been configured by the same Configurator can thereby check whether they can trust the public network access key of other devices. The DPP Configuration Response message may also contain the Wi-Fi passphrase or Pre Shared Key (PSK) of the network. The Enrollee sends a DPP Configuration Result message (depending on the version of DPP) to the Configurator to let it know whether it accepts the configuration or not. Not receiving this message by the Configurator may indicate to the Configurator that there was a Wi-Fi problem between the Configurator and the Enrollee. Then the 'supposedly configured' Enrollee can send its Connector to a DPP configured AP 2. If the Connectors signature is found correct and if the AP 2 has a matching Connector, i.e. a Connector for the same network, signed by the same Configurator, the AP2 sends its own Connector to the Enrollee. The Enrollee and the AP 2 can compute a symmetric key based on each other's network access key in the Connectors and their own private network access key in Diffie-Hellman fashion [DH]. This symmetric key can be used by the Enrollee as a PSK to associate with the AP 2.

At S8, the Enrollee 4 or 5 attempts to connect to the network. In case of Wi-Fi, the Enrollee will have received a Wi-Fi password or Wi-Fi Pre Shared key (PSK), with which the Enrollee tries to associate with the AP 2 in the normal way through the 4-way handshake as specified in [802.11]. If the connection attempt is successful, the flow passes to S9 where it is complete.

On the other hand, if the Enrollee fails to connect, different outcomes are possible.

For a complex device 4, the Enrollee may display messages to the user to make them aware of the status and instruct them how to resolve the problems. However, a simple device 5 does not have a UI. If it does not succeed in connecting, it gives up trying after a time-out period for which it is programmed unless it has further programming as outlined herein.

The protocol may require, and indeed DPP does, that the Enrollee return to the Configurator a connection status message. In the case of DPP, the message is called the DPP Connection Status Result and is of the form Enrollee→Configurator: {E-nonce, DPP Connection Status}ke The DPP Connection Status and E-Nonce are encrypted using an encryption key ke calculated during the initial authentication. The values of DPP Connection Status are given in the table below

| Connection Attempt Result | DPP Connection Status |
|---|---|
| Enrollee successfully associated to the AP and has network access | STATUS_OK |
| Enrollee discovered the AP and failed to connect to the network. | STATUS_AUTH_ FAILURE |
| Enrollee received an invalid connector during network introduction. | STATUS_INVALID_CONNECTOR |
| Received AP Connector is verified and valid but no matching Connector could be found by Enrollee. | STATUS_NO_MATCH |
| Enrollee failed to discover an access point. | STATUS_NO_AP |

In case the DPP Connection Status is STAUS_NO_AP, the DPP Connection Status attribute also contains a channel list indicating the channels that the Enrollee scanned in attempting to discover the AP it was configured to connect to.

If the status message indicates that the Enrollee was successful in connecting to the network it was just configured for, the flow passes to S9.

If the status message indicates that the Enrollee was not successful, there are alternatives.

In one alternative solution, the flow may return directly to S7 where the Enrollee device sends a configuration request message with information on what type of configuration the Enrollee wants. In such case, the DPP Reconfig Announcement message would not be needed. It may be helpful to note that both devices would then use the key that had been established during the earlier authentication phase. Also, since this would form part of a single protocol execution, there would be no changing of MAC address, with the problems that brings.

Although most of the times the configuration will succeed and the Enrollee will be able to connect to the network it was just configured for, connection problem may arise any time, years even later on. It may be that the AP or Enrollee was at a certain moment moved to another location and thus became out of Wi-Fi (RF) reach. It may be that the NAK in the Enrollee Connector expired and did not get accepted anymore by the AP. It may be that the old AP was replaced by a new one and the Enrollee was overlooked in the reconfiguration for the new network.

In another alternative, the flow may pass to S10 (which may contain a series of message exchanges) where an attempt at a new configuration is made. In the case of DPP, this process consists of a series of messages:

Enrollee->Configurator: Reconfig Announcement message

Configurator->Enrollee Reconfig Authentication message

Enrollee->Configurator: Reconfig Authentication Response

Configurator->Enrollee: Reconfig Authentication Confirm

Enrollee->Configurator: Configuration Request

Configurator->Enrollee: Configuration Response

In the case of DPP, the DPP Reconfig Announcement is of the form:

Enrollee->Configurator: SHA256(C-sign key)

As can be seen, this is a simple message, consisting of the SHA-256 hash (see [FIPS180-4]) of the public signing key of the Configurator. A Configurator receiving this message can compute the SHA-256 hash of all of the public signing keys it has used before in order to see whether or not it has configured the Enrollee that sent the DPP Reconfig Announcement message, before. If the Configurator has configured the Enrollee before, it will take on the role of Initiator in the reconfiguration and proceed by sending the DPP Reconfig(uration) Authentication request message back to the Enrollee. The form of the DPP Reconfig Authentication Request is:

Configurator->Enrollee: TransId, Protocol Version, I-Connector, I-nonce.

DPP Connectors contain a so-called public network access key (NAK) and other information. DPP Connectors are digitally signed by the Configurator signing key. The I-Connector is the Initiator's Connector i.e. that of the Configurator.

The DPP Connector of an Enrollee and an AP may match or not. When they match, both devices can compute the PMK (Pairwise Master Key) that Enrollee needs for associating with the AP, see section 6.6 of [DPP]. This computation is based on the Diffie-Hellman procedure [DH]. One of the requirements for two DPP Connectors to match is that they use the same type of public key. By 'same type of public key', it is meant the same type of encryption and certain parameters relating to the encryption are the same.

For example, the implementation of the protocol in [DH] uses the multiplicative group of integers modulo q, where q is prime (referred to in [DH] as "a finite field GF(q) with a prime number q of elements), and $\alpha$ is a primitive root modulo q (referred to in [DH] as "a fixed primitive element of GF(q)). Both parties have to agree on q and a when using the implementation of Diffie-Hellman as described in [DH]. All public keys generated with the same value of q and a are considered the same type of public key for the purposes of the present document.

One may also use elliptic curves for Diffie-Hellman, see [NIST 800-56A-3]. When using elliptic curves, both parties have to agree on all the elements defining the elliptic curve, that is, the domain parameters of the scheme. Table 24 in [NIST 800-56A-3] lists many named sets of domain parameters, e.g. P-256, P-384 and P-521. The larger the number in the name, the better or stronger the security is that Diffie-Hellman provides against attacks. All public keys generated with the same set of domain parameters for an elliptic curve, e.g. P-256, are considered the same type of public key for the purposes of the present.

It is useful to note that DPP specifies the use of P-256, P-384, P-521, Brainpool P-256r1, Brainpool P-384r1 and Brainpool P-512r1 for the DPP version of Diffie-Hellman in the DPP Authentication Protocol. The Brainpool curves are specified in [RFC 5639].

It should be understood that actual public keys, e.g. a particular P-256 key, when they are transferred in a message usually contain the type of public key in the structure that contains the public key. An example of an elliptic curve public key represented as the ASN.1 structure called SubjectPublicKeyInfo as specified in section 4.1 of [RFC 5280] is the following in ASN.1 notation:

```
SEQUENCE {
  SEQUENCE {
    OBJECTIDENTIFIER 1.2.840.10045.2.1 (ecPublicKey)
    OBJECTIDENTIFIER 1.2.840.10045.3.1.7 (P-256)
  }
  BITSTRING
0x0343A6A094A9BC6C9B92CBA3164849F0DB0B91350270ABE80DC554B1E6B3897F30 : 0 unused
bit(s)
}
```

Both OBJECTIDENTIFIERs together define the type of public key, while the BITSTRING contains the value of this particular public key.

In DPP, Elliptic Curve Cryptography [RFC 6090] is used for all asymmetric cryptography, especially the Network Access Key (NAK) and the Configurator signing key, but other forms of asymmetric cryptography, such as the multiplicative group of integers modulo q as described in [DH], are also possible.

The I-Connector sent in the DPP Reconfig(uration) Authentication request does not serve its normal purpose of configuring the Enrollee. Instead, it provides the Enrollee with a Configurator supplied public key, the Configurator NAK, which is signed by the Configurator, so that the Enrollee can check the signature and this way becomes able to trust that the Configurator NAK is indeed from its Configurator. The Configurator NAK in this case is used as one of the several components with which the Enrollee and Configurator create a shared key for the encrypted part of the DPP Reconfig Authentication protocol and the following DPP Configuration protocol. In this case, the Configurator NAK is also called $C_1$ in the DPP specification [DPP].

Now, an Enrollee receiving a DPP Reconfig Authentication Request message from its Configurator uses the NAK in its own Connector, (the R-Connector it received from its Configuration during the previous DPP Configuration), and the I-Nonce and $C_1$ from the I-Connector it received in the DPP Reconfig Authentication Request to compute a key ke, as specified in section 6.5.4 "DPP Reconfig Authentication response" of [DPP].

The form of the DPP Reconfig Authentication Response is:

Responder->Initiator: TransId, Protocol Version, R-Connector, Pr, $\{$I-nonce, R-nonce, Connection Status$\}_{ke}$ The attribute "Connection Status" is the same one as the DPP Connection Status explained above. With this attribute, the Enrollee informs the Configurator on what it knows about the connection problem, so that the Configurator can determine that it can perform automatic reconfiguration, e.g. when the Enrollee NAK has expired. When the connection status indicates a failure to find an AP, this can be understood as a problem with the wireless link itself (the Enrollee and AP are not within range) or that there is a problem with the AP. In turn, this may mean that the user of the Configurator has to do something first before the Enrollee can be reconfigured again, e.g. configure the AP again, or move devices closer to one another. In case the user has to intervene first, the Configurator may alert the user to this fact using its UI e.g. in the form of an alert, an Android notification and/or as a configuration 'to-do list' which it has stored.

When the DPP Configurator receives a DPP Reconfig Announcement from the Enrollee, the DPP Configurator may be able to identify the MAC address of the Enrollee sending the original Reconfig Announcement message. From that, the configurator could identify the Enrollee device and the history of previous executions of the configuration or reconfiguration protocol, including the reason given in a DPP Status previously provided by the Enrollee. As can be seen, there are several messages exchanged before the DPP Configurator can assess why the previous configuration and connection attempt apparently has failed.

It should be understood that initial request for reconfiguration (for DPP, the DPP Reconfig Announcement) may be repeated until the Enrollee obtains a response from the Configurator. In the case of complex Enrollee device, the user may be informed by the device UI of the problem and be given information to solve the problem. However, in the case of a simple Enrollee device, the Enrollee may simply carry on repeating its request for reconfiguration, rather than remaining unconnected and so not usable. This may well occur without the knowledge of the user.

When the Configurator is able to identify the actual device, it could be able to determine that there are circumstances which mean that the (re)configuration should not proceed—or at least not without user intervention. The Configurator may able to determine that this is the case by identifying the relevant message from the Enrollee it received concerning the status of the connection. For example, when the Enrollee has failed to find an AP, the user intervention could be something like moving the Enrollee closer to the relevant access point or fixing a problem with the access point.

The inventor has realised that a serious problem arises. The current trends are for devices increasingly to use random (Wi-Fi) MAC addresses to preserve privacy. A Wi-Fi device transmits many times what is called a probe request (see [802.11]) in order to find out which APs are within its Wi-Fi range. Were it always to use the same MAC address, a device's location could be tracked, which may be considered undesirable and a violation of privacy. To preserve its privacy, a device may use random MAC addresses for each complete protocol exchange, so its location can no longer be tracked using its MAC address.

The consequence of a device using random MAC addresses for a DPP reconfiguration is that the Configurator now does not know the actual identity of the Enrollee, since multiple requests for (re-)configuration may arrive with different MAC addresses. This means, in turn, that the Configurator will have to wait for the DPP Reconfig Authentication Response message in order to know which actual Enrollee it is dealing with and therefor whether or not it is able to reconfigure the current sender of the just received DPP Reconfig Announcement message. The DPP specification allows the Configurator to signal to the Enrollee that it is or is not going to (re-)configure the Enrollee only with the DPP Configuration Response message, which message is the fifth Wi-Fi message after the DPP Reconfig Announcement message. If there is a reason outside the control of the Configurator and Enrollee (for example, a poor connection to the AP or a malfunction in the AP), the reconfiguration attempt will fail (again).

With a simple Enrollee device, the danger is that the Configurator and Enrollee end up in a reconfiguration loop, where the Enrollee just starts the reconfiguration process over again automatically and without giving any external signals that it is doing so. This may result in another series of six (including the DPP Reconfig Announcement) reconfiguration message exchanges only to arrive in yet another failure. This wastes resources and bandwidth.

The reconfiguration process, especially in situations where the Enrollee device is using random MAC addresses, may be rendered more efficient and robust by having the Enrollee send a request for reconfiguration (the DPP Reconfig Announcement) with not only the cryptographic hash of the Configurator public signing key but an indication of the identity of the Enrollee. However, the inventor has realized that simply sending the identity of the Enrollee in the clear or simple encryption of the identity of the Enrollee by a public key of the target device is not sufficient, since the encrypted identity of the Enrollee remains unique and it can be tracked, despite using a random MAC address. In order to have a solution to this problem, it is necessary to break the one to one mapping between the identity of the Enrollee and the corresponding data being sent in the clear. This can be achieved by using additional random information in the encryption process such that multiple encrypted sets of data correspond to the same identity of the Enrollee. The Configurator would perform decryption, extract the identity of the Enrollee and ignore the random information. The improved message, according to an embodiment, may thus be:

Enrollee->Configurator: SHA256(C-sign key), $\{\text{A-nonce, E-id}\}_{Epublic\ signing\ key}$ The Configurator receiving this is then able to link this identity to the stored result of a previous configuration attempt. An improved Configurator, according to an embodiment, may then decide whether or not to continue the reconfiguration on the basis of the result of the previous configuration. Where the Configurator decides not to continue, the process passes to S11 where, at least for the present protocol execution, it terminates. By 'terminate', it should be understood that (re)configuration may be restarted later.

The identity E-id of the Enrollee could be a random number, or (part of) the coordinate(s) of a public ECC key, such as the Protocol key or the NAK of the Enrollee, or random point on the curve of the signing key that is specifically generated for this purpose. The Enrollee should create an E-id before it sends its first DPP Reconfig Announcement message and keep this E-id constant up to when it received a DPP Configuration message containing a new Configuration object, see section 4.5 "DPP Configuration Object" of [DPP]. The Enrollee may generate the E-id earlier, e.g. after a reset or factory reset and may keep it longer, e.g. until the next (factory) reset, as long as it is kept constant from the first DPP Reconfig Announcement message until successful reconfiguration.

Thus the method of configuring an Enrollee device for communications in a wireless network, the method comprises providing a Configurator device, the Configurator and Enrollee devices performing at least part of a configuration protocol, the Enrollee device encrypting Enrollee identifying information using a public key information of the Configurator and random information to produce a first encrypted message, the Enrollee device transmitting the first encrypted message to the Configurator device, the Configurator device receiving the first encrypted message, the Configurator device decrypting the first encrypted message using private key information associated with the public key, the Configurator device identifying the Enrollee device using the Enrollee identifying information and deciding whether or not it should continue the configuration based on the Enrollee identifying information.

When the Configurator decides not to continue the reconfiguration protocol, it may simply not reply to the reconfiguration request message (the DPP Reconfig Announcement, in the case of DPP). The Enrollee may continue to send requests up to a point where a timeout occurs and it stops. Alternatively, the Configurator could also send a message to the Enrollee, rejecting the request to reconfigure, optionally including also the reason(s) why.

The Enrollee may change its MAC address for any of these reconfiguration request messages in order to preserve its privacy. The Enrollee should keep its MAC address constant during the execution of the complete series of message exchanges of a protocol, e.g. from when it receives a DPP Reconfig Authentication Request message up to and including all DPP Configuration messages.

The encryption with the public signing key of the Configurator may be based on elliptic curve cryptography, see [SEC1702]). Let $s_c$ be the private signing key of the Configurator and $S_C = s_c G$ be his public key, where G is the generator or base point of the curve, which is publicly known. The Enrollee E wants to send an encrypted message to C, the Configurator. The Enrollee E knows the Configurator public signing key $S_C$ from a previous configuration, where the public signing key of the Configurator was sent to it in the Configuration Object in the Configuration Response message. The Enrollee E does the following:

1. E chooses a random number r, $1 \leq r \leq n-1$ and computes rG, where n is the order of G., i.e. nG equals the so called point at infinity or identity point O for which P=O+P holds for all points P on the curve. The random number r here is the value of the A-nonce above.
2. E then computes $M + rS_C$. Here the message M is a point in $\langle G \rangle$ and represents the identity E-id of E, as explained later on.
3. E sends the value pair $\langle rG, M + rS_C \rangle$ to the Configurator C as part of the DPP Reconfig Announcement message. This is a tuple consisting of two elliptic points, which together represent the $\{\text{A-nonce, E-id}\}_{public\ signing\ key}$ mentioned above.

On receiving this encrypted text, the Configurator C decrypts $\{\text{A-nonce, E-id}\}_{public\ signing\ key}$ in the following manner 1. C extracts rG and computes $s_c \cdot (rG) = r \cdot (s_c G) = rS_C$ making use of $S_C = s_c G$
2. C extracts the second part of the pair $M + rS_C$ and subtracts out $rS_C$ to obtain $M + rS_C - rS_C = M$ In the above scheme, the generator G would correspond to the base point of the used curve, $S_C = s_c G$ would correspond to the public key as used in the ECC encryption algorithm and $s_c$ would correspond to the private key as it is the secret used for decryption. It should be noted that ECC already has a built-in randomization during encryption by means of the random number r. Hence other mechanisms that concatenate the identifying information and the random information are possible, as long as the receiving device is able to obtain the identifying information.

When the Enrollee uses its public Network Access key as identifier E-id, the elliptic point M above is taken as the public Network Access key of the Enrollee. Similarly for when the Enrollee would use another elliptic point on the same curve as identity, e.g. a public bootstrapping key. Note that using the public Network Access key as identifier E-id or another public key is only possible when the curve type of these keys is the same as the curve type of the signing key of the Configurator.

When the Enrollee does not use an elliptic point as identity, or when the curve types of the elliptic point to be used as an identity and that of the Configurator signing key are different, the identity E-id should first be transformed to an elliptic point M. The background of this is that not all values of x, $1 \leq x \leq n-1$ are the x-coordinate of a point on the curve. [SEC1702] lists several methods for converting blocks of plaintext to elliptic points and back. In case the identity is an elliptic point on a different curve that that of the signing key of the Configurator, the x-coordinate of the identity point can be taken as the value to convert to a point on the curve of the Configurator signing key. If the curve used for the elliptic points that represent the identity of the Enrollee contains more points than the curve of the Configurator signing key, the x-coordinate of the point representing the identity has to be split into octet strings that each can be represented by points on the curve of the Configurator signing key and each of these octet strings is encrypted as a value pair $\langle rG, M+rS_C \rangle$ where the random number r is different for each octet string, or the same random number is used. The first possibility yields $\langle r_1G, M_1+r_1S_C \rangle$ $\langle r_2G, M_2+r_2S_C \rangle$ . . . $\langle r_nG, M_n+r_nS_C \rangle$ and the second possibility yields $\langle rG, M_1+rS_C, M_2+rS_C, \ldots M_n+rS_C \rangle$.

Elliptic points may be represented in several ways. One way is to us the value of both its x and y-coordinate. Another way is to use the value of the x-coordinate and only the sign of the y-coordinate. This is because an ECC curve is always of the form $y^2=f(x)$, where f(x) is a third-order polynomial. If one knows the x-coordinate of an elliptic point, e.g. x1, one computes sqrt(f(x1)) and one knows the y-coordinate of the point except for its sign. These so-called Element-to-Octet-String conversion and Octet-String-to-Element conversion techniques for representing ECC points and interpreting octet strings representing ECC points can be found in [802.11].

Each of the above two ways can be used to represent the ECC points rG, and $M+rS_C$ in the tuple $\langle rG, M+rS_C \rangle$ mentioned above.

The tuple $(rG, M+rS_C)$ can be sent as a TLV (Tag, Length, Value) information element as used in the DPP specification, e.g.

| Field | Size (octets) | Value (Hexadecimal) | Description |
|---|---|---|---|
| Attribute ID | 2 | variable | Identifying the type of DPP attribute, in this case the encrypted Enrollee identity $\{$A-nonce, E-id$\}_{public\ signing\ key}$ |
| Length | 2 | variable | Length of the following fields in the attribute. |
| Attribute body field | Encrypted A-nonce | variable | The elliptic point representing the encrypted A-nonce, i.e. the generator G of the curve multiplied by r, the value of A-nonce |
| | Encrypted E-id | variable | The elliptic point representing the encrypted E-id, i.e. the elliptic point M representing the E-id, e.g. the public NAK of the Enrollee, added to A-nonce times the public signing key of the Configurator |

in case the Enrollee knows an RSA public key of the Configurator, the public key encryption of the E-id may be based on the RSA algorithm [RSA]. The bitstring representing the E-id is combined, e.g. concatenated, with a second string (nonce or other random information) before being encrypted. The Configurator would use its private key to decrypt the received encrypted information, and it would discard the second string to extract the E-id.

Optionally, the message may also contain an element Group which is the Finite Cyclic Group attribute as specified in clause 8.1.1.12 "Finite Cyclic Group attribute" of [DPP], using the registry maintained by IANA as "Group Description" attributes for IETF RFC 2409 [RFC 2409] and [IKE] and group indicates the type of public key of the NAK in the Connector of the Enrollee. Other ways to indicate the type of public key are of course also possible, e.g. by using an appropriate set of OBJECTIDENTIFIERs as done in the ASN.1 example of a public key mentioned before, or by the ASN.1 structure called AlgorithmIdentifier as specified in section 4.1.1.2 of [RFC 5280].

Optionally, the improved message may contain the Enrollee's previous Connection Status attribute. This would have the benefit of allowing the Configurator to inspect it without having to identify the Enrollee and then look back to find the previously received Connection Status, though the message would be longer than with the E-id. Since the Connection Status, itself, does not allow easy identification of the Enrollee, it should not engender privacy issues. A form of this message could be Enrollee->Configurator: SHA256(C-sign key), DPP Connection Status or, optionallyEnrollee->Configurator: SHA256(C-sign key), $\{$A-nonce, DPP Connection Status$\}_{Epublic\ signing\ key}$ or, optionally Enrollee->Configurator: SHA256(C-sign key), DPP Connection Status, Group or, optionally Enrollee->Configurator: SHA256(C-sign key), $\{$A-nonce, DPP Connection Status, Group$\}_{Epublic\ signing\ key}$ Notwithstanding, it may be useful to have both the Connection Status and the E-id in the improved message.

Figure 3A:
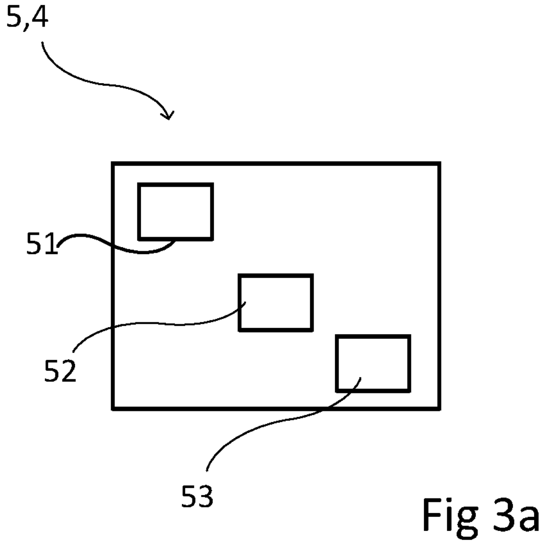
FIG. 3*a* represents an Enrollee device according to an embodiment.

FIG. 3*a* represents an Enrollee device 5,4 according to an embodiment. The Enrollee 5,4 comprises a receiver 51 arranged to receive a Configurator device public key from the Configurator, a security module 52 arranged to encrypt, using the Configurator device public key, a first encrypted message, the first encrypted message comprising an Enrollee identifying information and a random information, and a transmitter 53 arranged to transmit the first encrypted message to the Configurator device.

Figure 3B:
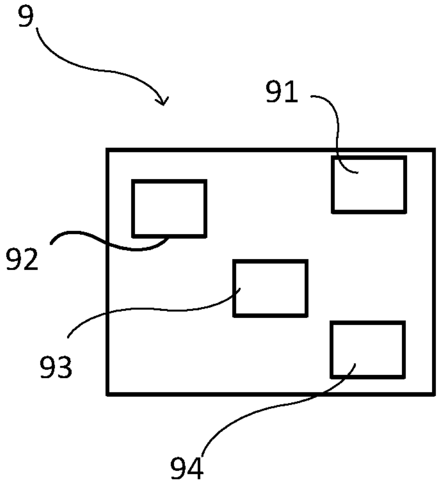
FIG. 3*b* represents a Configurator device according to an embodiment.

FIG. 3*b* represents a Configurator device 9, according to an embodiment. The Configurator device 9 which is arranged to configure an Enrollee device using a configuration protocol, comprises a transmitter 91, arranged to send a Configurator device public key to the Enrollee. The Configurator device 9 comprises a receiver 92 arranged to receive a first encrypted message from the Enrollee device, a security module 93 arranged to decrypt, using a Configurator device public key, the first encrypted message and to derive Enrollee identifying information from the first encrypted message, and a processor 94 arranged to decide whether or not to continue the configuration protocol based on the Enrollee identifying information.

The receivers, transmitters, security modules and processors of the Configurator and Enrollee may be implemented in hardware, software or varying combinations thereof.

The Configurator, when it receives this message (the DPP Reconfig Announcement message, enhanced, according to an embodiment, with the Enrollee identifying information is then able to identify the previous connection result of the Enrollee and detect a situation where it should not continue with the reconfiguration protocol. It is then no longer necessary for the Configurator to embark on a process of attempting a reconfiguration which has a high likelihood of failing again, saving significantly on the use of resources i.e. time and bandwidth.

Furthermore, this is particularly useful where the Enrollee is a simple device in that the process may proceed automatically i.e. avoiding that the user to left unaware of the fact that the connection has not succeeded and the Configurator and Enrollee are stuck in potentially endless loop, as opposed to the Enrollee device being connected to the network. Furthermore, the user is more likely to detect that the connection has failed when the reconfiguration process stops early because they may be able to determine that the devices are idle whereas the reconfiguration loop may prevent the status being identified correctly to the user.

Optionally, the Configurator device could provide an indication to the user that it has terminated the (re)configuration protocol unilaterally so as to alert the user to the existence of a problem with the Enrollee. The indication may also contain an indication of the identity of the Enrollee and, optionally, instructions based on the 'to-do list' mentioned above. When the user has solved their part of the problem, they may instruct the Configurator that it can now reconfigure this Enrollee, so that the Configurator will reply to the next DPP Reconfig Announcement of this Enrollee and reconfigure this Enrollee, sending it a new Connector in the sixth message of the protocol, i.e. the DPP Configuration Response.

Optionally, where the Enrollee has a user interface which is capable of displaying the configuration status (e.g. an LED which blinks at different rates according to whether the Enrollee is being configured, is successfully connected etc.), it may display the result of the (re)configuration, including the reconfiguration rejection.

Optionally in another embodiment, the encrypted E-id may already be generated and sent in any of the messages of the 'normal' DPP protocol that the Enrollee sends to the Configurator, i.e. in any of the DPP Authentication Request, DPP Authentication Response, DPP Authentication Confirm, DPP Configuration Request, DPP Configuration Result and DPP Connection Status Result messages. In particular, it would be advantageous that the Enrollee sends its encrypted E-id already in the DPP Connection Status Result message, because the DPP Connection Status attribute of this message also contains information on the problem the Enrollee may have in connecting to the network it was just configured for with the DPP Configuration Response message. If the Enrollee was unsuccessful in connecting to the network, and the user is required to do something first before this Enrollee can be configured successfully again and the Enrollee does include its encrypted E-id, the Configurator is now able to discard the very first DPP Reconfig Announcement of this Enrollee, thereby saving the exchange of five Wi-Fi messages. The DPP Connection Status Result is now of the form Enrollee→Configurator:

{E-nonce, DPP Connection Status}ke, $\{\text{A-nonce, E-id}\}_{Epublic\ signing\ key}$ Any of the other DPP messages can be augmented in the same way. The Enrollee should keep its E-id constant from sending the message containing the encrypted E-id to at least the reception of a DPP Configuration message containing a new Configuration object.

Figure 4A:
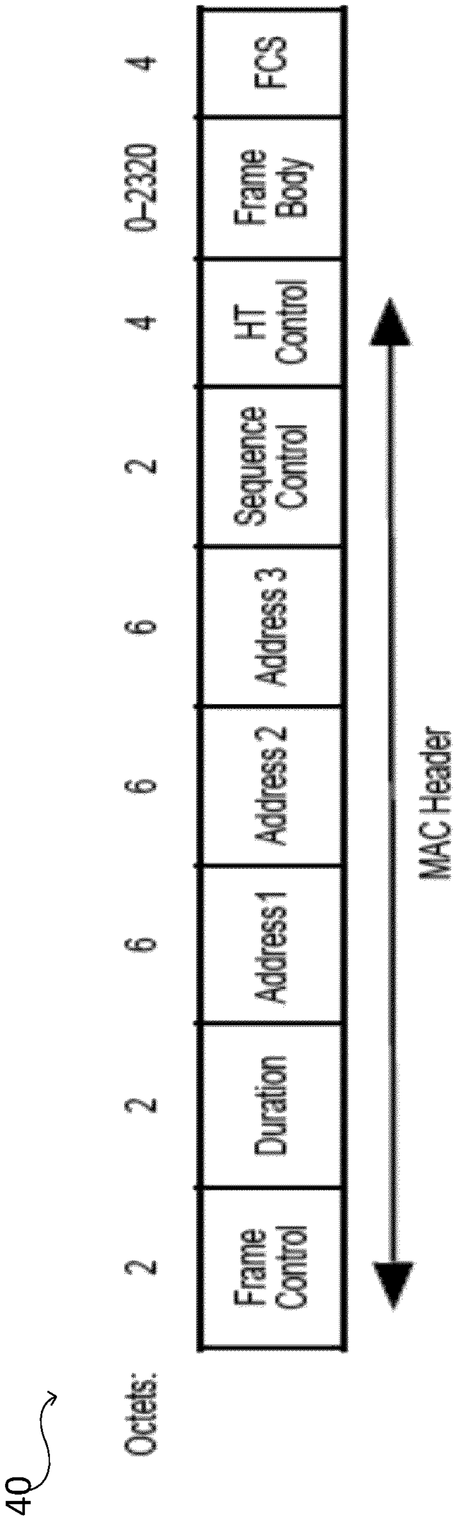
FIG. 4*a* represents an exemplary 802.11 MAC frame which may be according to an embodiment.

FIG. 4*a* represents an example of a Medium Access Control (MAC) frame. The example in question is that of the IEEE 802.11 standard. It should be understood however that other formats are possible as long as there is a frame body or payload part. For the purposes of the present, the other parts, frame header and the error checking (here FCS) are not important.

In the DPP Configuration Protocol phase of DPP, the general MAC frame format is that of the GAS Frame according to the IEEE 802.11 standard. In the DPP Authentication protocol phase of DPP, the general MAC frame format is that of the Public Action frame according to the IEEE 802.11 standard. Attributes may be added to the various messages, including the Reconfig Announcement messages.

Figure 4B:
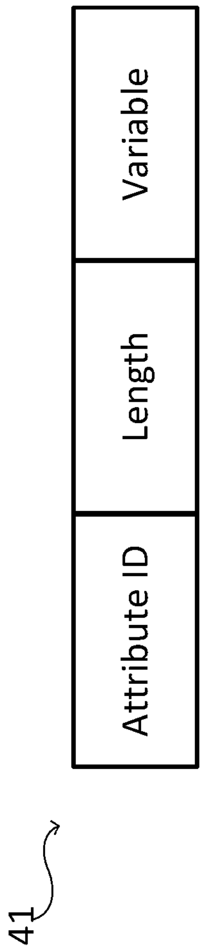
FIG. 4*b* represents an attribute according to an embodiment for an 802.11 MAC frame.

FIG. 4*b* represents the general form of an attribute which would form part of the payload of the frame of FIG. 4*a* and would contain the content of Reconfig Announcement and Reconfig Request message according to embodiments i.e. SHA256(C-sign key), E-id and TransId, Protocol version Version, I-Connector, I-nonce, respectively.

Since the Configurator has to detect this, it must be programmed accordingly to parse the messages correctly. It should be understood that this adds complexity and lengthens the execution time for the Configurator. There is also added complexity on the Enrollee side in that more complicated firmware and larger non-volatile memory are required. It should be borne in mind that there is great downward price pressure on such devices and even apparently small additions demand justification. Furthermore, many such devices are battery-powered and any extra energy expenditure, such as retrieving information, composing more complex messages and sending those more complex and longer messages is actively discouraged, particularly where the batteries are small and intended to last a long time. Lastly, changing the protocol often involves other modifications to allow handling of legacy devices.

Aspects of the embodiments may be implemented in a computer program product, which may be a collection of computer program instructions stored on a computer readable storage device which may be executed by a computer. The instructions may be in any interpretable or executable code mechanism, including but not limited to scripts, interpretable programs, dynamic link libraries (DLLs) or Java classes. The instructions can be provided as complete executable programs, partial executable programs, as modifications to existing programs (e.g. updates) or extensions for existing programs (e.g. plugins). Moreover, parts of the processing of the present invention may be distributed over multiple computers or processors.

Storage media suitable for storing computer program instructions include all forms of non-volatile memory, including but not limited to EPROM, EEPROM and flash memory devices, magnetic disks such as the internal and external hard disk drives, removable disks and CD-ROM disks. The computer program product may be distributed on such a storage medium, or may be offered for download through HTTP, FTP, email or through a server connected to a network such as the Internet.

The following may be used as reference documents:

[802.11] IEEE Computer Society, "IEEE Standard for Information Technology-Telecommunications and Information Exchange Between Systems—Local and Metropolitan Area Networks—Specific requirements Part 11: Wireless LAN Medium Access Control (MAC) and Physical Layer (PHY) Specifications," (IEEE Std. 802.11-2016), December 2016

[DH] Diffie, W.; Hellman, M. (1976), "New directions in cryptography", IEEE Transactions on Information Theory, 22 (6): 644-654

[DPP] Device Provisioning Protocol—Technical Specification—Version 1.0, Wi-Fi Alliance, 2018, https://www.wi-fi.org/file-member/device-provisioning-protocol-specification.

[FIPS180-4] FIPS180-4, "Secure Hash Standard", United States of America, National Institute of Standards and Technology, Federal Information Processing Standard (FIPS) 180-4

[IKE] Internet Key Exchange (IKE) Attributes, Group Description (Value 4), https://www.iana.org/assignments/ipsec-registry/ipsec-registry.xhtml#ipsec-registry-10

[NIST 800-56A-3] NIST Special Publication 800-56A, Revision 3, "Recommendation for Pair-Wise Key-Establishment Schemes Using Discrete Logarithm Cryptography", Elaine Barker, Lily Chen, Allen Roginsky, Apostol Vassilev, Richard Davis, https://doi.org/10.6028/NIST_SP.SP.800-56Ar3

[RFC 2409] RFC 2409, The Internet Key Exchange, November 1998, https://datatracker.ietf.org/doc/rfc2409/.

[RFC 5280] RFC 5280, Internet X.509 Public Key Infrastructure Certificate and Certificate Revocation List (CRL) Profile, https://datatracker.ietf.org/doc.rfc5280

[RFC 5639], RFC 5639 Elliptic Curve Cryptography (ECC) Brainpool Standard Curves and Curve Generation, March 2010, http://datatracker.ietf.org/doc/rfc5639/.

[RFC 6090] RFC 6090, Fundamental Elliptic Curve Cryptography Algorithms, February 2011 https://datatracker.ieftf.org/doc/rfc6090

[RSA] Rivest, R.; Shamir, A.; Adleman, L. (February 1978). "A Method for Obtaining Digital Signatures and Public-Key Cryptosystems",

The invention claimed is:

1. A method of configuring an enrollee device for communications in a wireless network, the method being arranged to be used with a configurator device, and comprising:

performing, by the configurator device and enrollee device, at least part of a configuration protocol;

generating, by the enrollee device, enrollee device identifying information;

encrypting the enrollee identifying information using a public key information of the configurator device and random information to produce a first partly encrypted message;

transmitting, by the enrollee device, the first partly encrypted message to the configurator device;

receiving, by the configurator device, the first partly encrypted message;

decrypting, byte configurator device, the encrypted part of the first partly encrypted message using private key information associated with the public key;

identifying, by the configurator device, the enrollee device using the enrollee identifying information; and determining, whether the configurator device will continue the configuration based on the enrollee identifying information, wherein the enrollee device identifying information remains constant between the time of sending the first partly encrypted message and when the enrollee device next receives configuration information.

2. The method of claim 1, wherein if the configurator device decides it should not continue with the configuration, it does not reply to the first encrypted message.

3. The method of claim 1, wherein the enrollee device transmits the first partly encrypted message as a result of failing to connect to the wireless network.

4. The method of claim 1, wherein if the configurator device decides it should not continue with the configuration, it sends a rejection message to the enrollee device.

5. The method of claim 1, wherein the configuration protocol is according to the Wi-Fi DPP protocol and the first encrypted message is the DPP Reconfiguration Announcement message.

6. The method of claim 1, wherein the enrollee device identifying information is used by the configurator device to identify a stored record of an enrollee connection status previously sent by the enrollee device during the execution of part of the configuration protocol.

7. The method of claim 1, wherein the part of the configuration protocol comprises sending, by the enrollee device, the enrollee device identifying information.

8. The method of claim 1, further comprising, by the configurator device, displaying a status and/or instructions for the user in the event of a decision not to continue.

9. A computer program product on a non-transitory machine-readable storage medium, configured, when run on a configurator processor, to implement the configurator part of the method of claim 1.

10. A computer program product on a non-transitory machine-readable storage medium, configured, when run on an enrollee processor, to implement the enrollee part of the method of claim 1.

11. An enrollee device arranged to be configured for communication in a wireless network by a configurator device using a configuration protocol, the enrollee device comprising:

a receiver arranged to receive a configurator device public key from the configurator device;

a security module arranged to encrypt, using the configurator device public key, a first partly encrypted message, the encrypted part of the first partly encrypted message comprising enrollee device identifying information with a random information; and a transmitter arranged to transmit the first partly encrypted message to the configurator device;

wherein the enrollee device is arranged to generate the enrollee device identifying information before transmitting the first partly encrypted message, and to keep the enrollee device identifying information constant until a configuration information is received from the configurator device.

12. The enrollee device of claim 11, wherein the enrollee device sends the first partly encrypted message as a result of a failure to connect to the wireless network.

13. The enrollee device of claim 11, wherein if the configurator device decides it should not continue with the configuration, it does not reply to the first encrypted message.

14. The enrollee device of claim 11, wherein if the configurator device decides it should not continue with the configuration, it sends a rejection message to the enrollee device.

15. The enrollee device of claim 11, wherein the enrollee device identifying information is used by the configurator device to identify a stored record of an enrollee connection status previously sent by the enrollee device during the execution of part of the configuration protocol.

16. A configurator device arranged to configure an enrollee device using a configuration protocol, the configurator device comprising:

a transmitter, arranged to send a configurator device public key to the enrollee;

a receiver arranged to receive a first partly encrypted message from the enrollee device;

a security module arranged to decrypt, using a configurator device private key, the encrypted part of the first partly encrypted message, to derive enrollee identifying information from the first encrypted message, and, where a previous attempt to configure the enrollee device has occurred, compare the enrollee device identifying information to a previously received enrollee device identifying information; and a processor arranged to decide whether or not to continue the configuration protocol based on the comparing.

17. The configurator device of claim 16, arranged to display a status and/or instructions to the user in the event of a decision not to continue the protocol.

18. The configurator device of claim 16, wherein if the configurator device decides it should not continue with the configuration, it does not reply to the first encrypted message or sends a rejection message to the enrollee device.

19. The configurator device of claim 16, wherein the enrollee device identifying information is used by the configurator device to identify a stored record of an enrollee connection status previously sent by the enrollee device during the execution of part of the configuration protocol.

20. The configurator device of claim 16, wherein the part of the configuration protocol comprises sending, by the enrollee device, the ephemeral enrollee device identifying information.

* * * * *